US00RE37349B1

(19) United States
(12) Reissued Patent
Chambers, Sr. et al.

(10) Patent Number: US RE37,349 E
(45) Date of Reissued Patent: Sep. 4, 2001

(54) INTEGRATED DIVERTER AND WASTE COMMINUTOR

(75) Inventors: Joseph W. Chambers, Sr., Rancho Mirage; Craig J. Fennessy, Huntington Beach; Robert T. Sabol, Aliso Viejo, all of CA (US)

(73) Assignee: Chambers, Boyd and Associates, Santa Ana, CA (US)

(21) Appl. No.: 09/055,229

(22) Filed: Apr. 6, 1998

Related U.S. Patent Documents

Reissue of:
(64) Patent No.: 5,505,388
Issued: Apr. 9, 1996
Appl. No.: 08/314,781
Filed: Sep. 29, 1994

(51) Int. Cl.[7] ..... B02C 18/40; B02C 23/36
(52) U.S. Cl. ..... 241/46.02; 241/46.06; 241/236
(58) Field of Search ..... 198/608, 780; 210/161, 173, 174, 297, 386; 241/46.02, 46.06, 77, 79, 79.3, 81, 235, 236

(56) References Cited

U.S. PATENT DOCUMENTS

| | | |
|---|---|---|
| 2,106,851 | 2/1938 | Nordell . |
| 2,163,977 | 7/1939 | Ferry . |
| 2,199,729 | 5/1940 | Peterson . |
| 2,342,927 | 2/1944 | Durdin, Jr. . |
| 2,614,695 | 10/1952 | Nordell . |
| 2,672,985 | 3/1954 | Nordell . |
| 2,933,189 | 4/1960 | Jellesma . |
| 3,188,942 | 6/1965 | Wandel . |
| 3,700,106 | 10/1972 | Wittke . |
| 4,147,634 | 4/1979 | Wegener . |
| 4,702,422 | 10/1987 | Chambers, Sr. et al. . |
| 4,762,281 | 8/1988 | Eberhardt . |
| 4,919,346 | 4/1990 | Chambers, Sr. . |
| 5,060,872 | 10/1991 | Chambers, Sr. . |
| 5,061,380 | 10/1991 | Stevenson . |
| 5,158,239 | 10/1992 | Vock et al. . |
| 5,333,801 | 8/1994 | Chambers, Sr. et al. . |

FOREIGN PATENT DOCUMENTS

| | | |
|---|---|---|
| 298514 | 7/1954 | (CH) . |
| 0512177 | 11/1992 | (EP) . |

OTHER PUBLICATIONS

Brochure entitled "Dimminutor—Specifications and Dimensions", 1 page, date unknown (see IDS).
Instruction manual for Type "A" Barminutor Screening and Comminuting Machine, Chicago Pump, 20 pages, date unknown (see IDS).
Brochure for Ecodyne Comminutors, 2 pages, date unknown (see IDS).

(List continued on next page.)

*Primary Examiner*—Timothy V. Eley
(74) *Attorney, Agent, or Firm*—Sughrue, Mion, Zinn, Macpeak & Seas, PLLC

(57) ABSTRACT

An integrated system for diverting and reducing the size of waste materials in an effluent stream comprising a frame having a bottom housing and a top housing and mountable in the stream. A grinder unit is mounted to the frame bottom housing and comprises a cutter assembly positioned in the stream and a drive mechanism coupled to the cutter assembly to rotate the cutter assembly. The drive mechanism may be electric or hydraulic. A screen unit is mounted to the frame. It may be a single screen or dual screens. The screen unit comprises a cylindrical screen rotating on a screen shaft having a screen shaft mounted on bottom housing of the frame and supporting the cylindrical screen. A drive assembly operable couples the drive mechanism to the screen shaft to rotate the cylindrical screen as the cutter assembly rotates. In operation with the screen unit positioned adjacent to the grinder unit it diverts solids in the effluent stream toward the grinder unit for size reduction. An auger-screen may be placed downstream for removal of large solids after size reduction.

50 Claims, 7 Drawing Sheets

OTHER PUBLICATIONS

Chicago Pump Comminutor Brochure, 3 pages, date unknown (see IDS).

Epco Comminutor Brochure, 4 pages, date unknown (see IDS).

Brochure by TLB Corporation, Comminutors—Treatment Plants, Lift Stations, Boost Systems, 2 pages, date unknown (see IDS).

Brochure entitled "Dimminutor—Open Channel Comminutor", 3 pages, date unknown (see IDS).

Robbins Myers Brochure entitled "Moyno Pipeliner—Effective Solution to Tough Conditioning Problems", 2 pages, date unknown (see IDS).

Brochure entitled "Fallova Shredder Co., Inc.", 3 pages, date unknown (see IDS).

"Screening Equipment Handbook", by Tom M. Pankratz, 1995, Chapters 8 and 9, one misc. page, and pages 178, 179, 183–196, 200–203.*

* cited by examiner

INTEGRATED DIVERTER AND WASTE COMMINUTOR

Matter enclosed in heavy brackets [ ] appears in the original patent but forms no part of this reissue specification; matter printed in italics indicates the additions made by reissue.

BACKGROUND OF THE INVENTION

This invention relates to the screening of an effluent having solid matter and the divisions of that solid matter to a grinding unit for purposes of size reduction. As is well known in waste water treatment, there are many environments where large volumes of liquid require initial processing for purposes of coarse screening so that large solid objects are diverted from the effluent stream and their size reduced by a grinding unit. The material, now of a reduced size, is either removed at the point of reduction of re-introduced into the stream for further processing downstream.

This invention is an improvement over the technology disclosed in U.S. Pat. No. 4,919,346. The '346 patent itself represented a significant improvement over prior vertically oriented belt screens which were typically used in waste water treatment plants for the purposes of removing solids from a liquid flow. Those prior devices thus utilized rakes, belts or the like which moved at an angle generally vertical, and therefore perpendicular to the fluid flow in a vertical plane. This resulted in undesirable hydrostatic effects in addition to propensity of such systems to clog and require a considerable amount of power for purposes of lifting solid materials.

The '346 technology departed from this prior technique by placing a horizontally moving screen directly in the effluent flow with an adjacent macerator (grinder) disposed in that flow to receive solids that were diverted by the screen. Consequently, the screen allowed fluid to pass through it but at the same time presented a barrier for solid matter that could not pass through the screening elements. That solid matter was then diverted to one side of the effluent flow where it was then ground into smaller particles and then those particles placed back into the stream for substantive downstream processing.

A variant of the screening technique utilizing interleaved discs is disclosed in U.S. Pat. No. 5,061,380. The '380 also utilizes a solid grinder placed on one side of the screening unit.

A common deficiency with prior screening systems is that they were powered separately, using drive units separate from that of the grinding unit. In many installations the screen itself need not have that independent source of power. However, in the prior art the screening unit was considered to be a device separate from that of the grinding unit although, once installed they operated as a single system.

Another disadvantage in the prior art is that the placement of the grinding unit relative to the screening unit becomes critical for efficiency in the system. By having separate mounting frames, positioning and proper orientation became difficult to maintain across a matrix of different channel configurations. Prior systems employed internal deflectors inside the screen cylinder to use water flow for the purpose of removing debris from the screen surface and into the cutter. The internal deflector, while functional, added a degree of complication. Moreover, prior systems generally required the use of side rails on the cylinder side of the grinder. The use of the side rail tended to promote the passage of waste material through the grinder without clogging but is an expensive component to such systems.

Additionally, prior art systems tended to utilize screens mounted in separate frames adding additional elements and complicated geared/drive mechanisms.

SUMMARY OF THE INVENTION

Given the deficiencies in the prior art it is an object of this invention to provide an integrated diverter and grinder unit that is of simple construction and easily maintained.

It is yet another object of this invention to provide an integrator diverter and grinder unit which has a single drive motor for rotating the diverter and driving the cutter unit.

A further object of this invention is to provide a combined diverter and grinder unit which may be powered either electrically, hydraulically or otherwise and has the ability to position the cutter unit on either side of the diverter unit in an integrated common mounting that, is affixed directly in the waste water channel.

These and other objects of this invention are accomplished by means of an integrated system which utilizes a common mounting structure for both the diverter screen and the grinding unit. Both the grinding unit and the screen are powered by a common drive source, typically an electric motor or hydraulic unit. Preferably the screen is in the form of a cylinder positioned so that its outer circumferential surface is substantially tangential to a circle drawn to circumscribe the elements of an adjacent cutter blade assembly. The screen may be placed at either the right or the left of the grinder unit. Alternatively, a pair of diverter cylinders can be employed with the grinder unit positioned in the center, again with both cylinders driven by a common drive source off the grinding unit.

The preferred drive arrangement utilizes a sprocket set up between the driven grinder shaft and the screen cylinder shaft by means of a chain. An advantage of having a common drive system is that if the grinder is reversed, direction of rotation of the screen will also automatically reverse. This set up eliminates the requirement existing in the prior art for separate motors, motor controls and interfaces between the grinder and the diverter screen.

This invention will be described in greater detail by referring to the drawings and the description of the preferred embodiment which follows.

DESCRIPTION OF THE PREFERRED EMBODIMENTS

Figure 1:
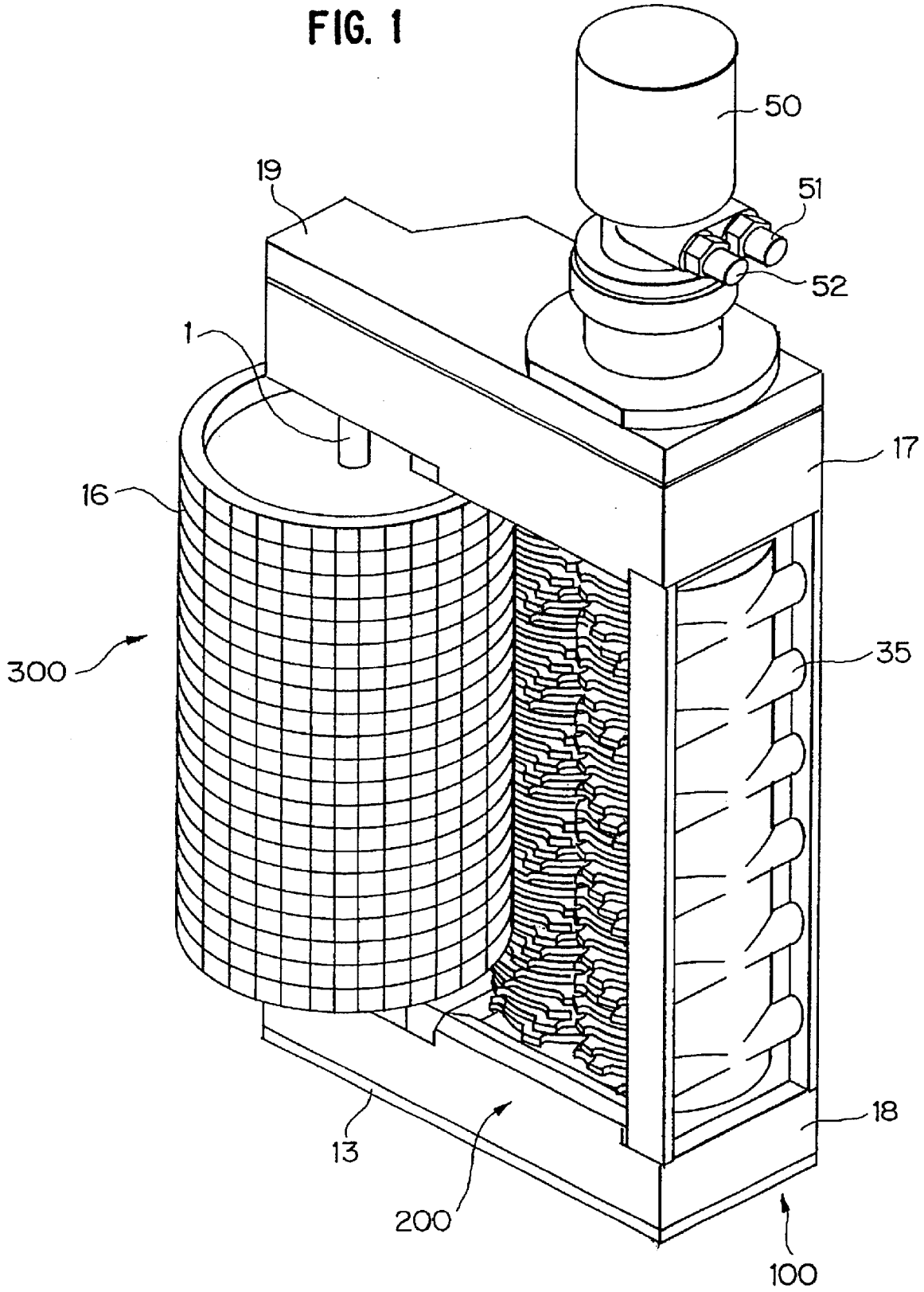
FIG. 1 is a perspective view of a first preferred embodiment of this invention.
Figure 2:
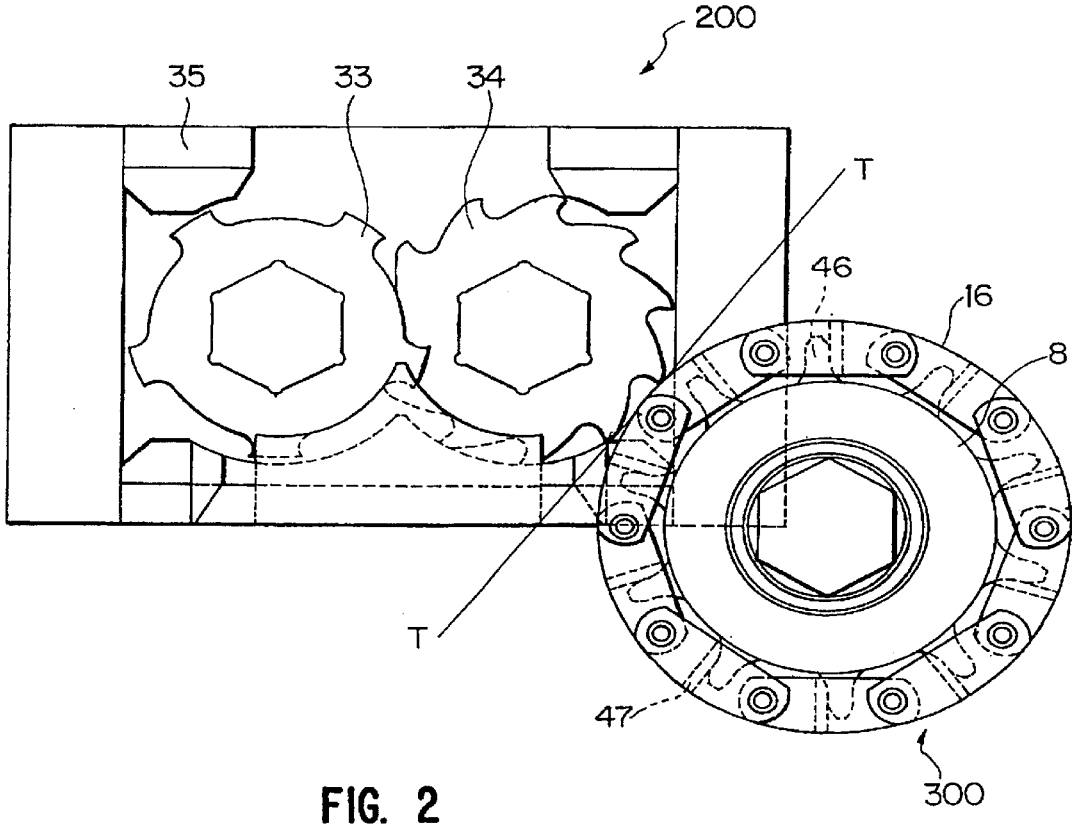
FIG. 2 is a top view illustrating the alignment of the grinder unit with the screen cylinder of the first preferred embodiment.
Figure 3:
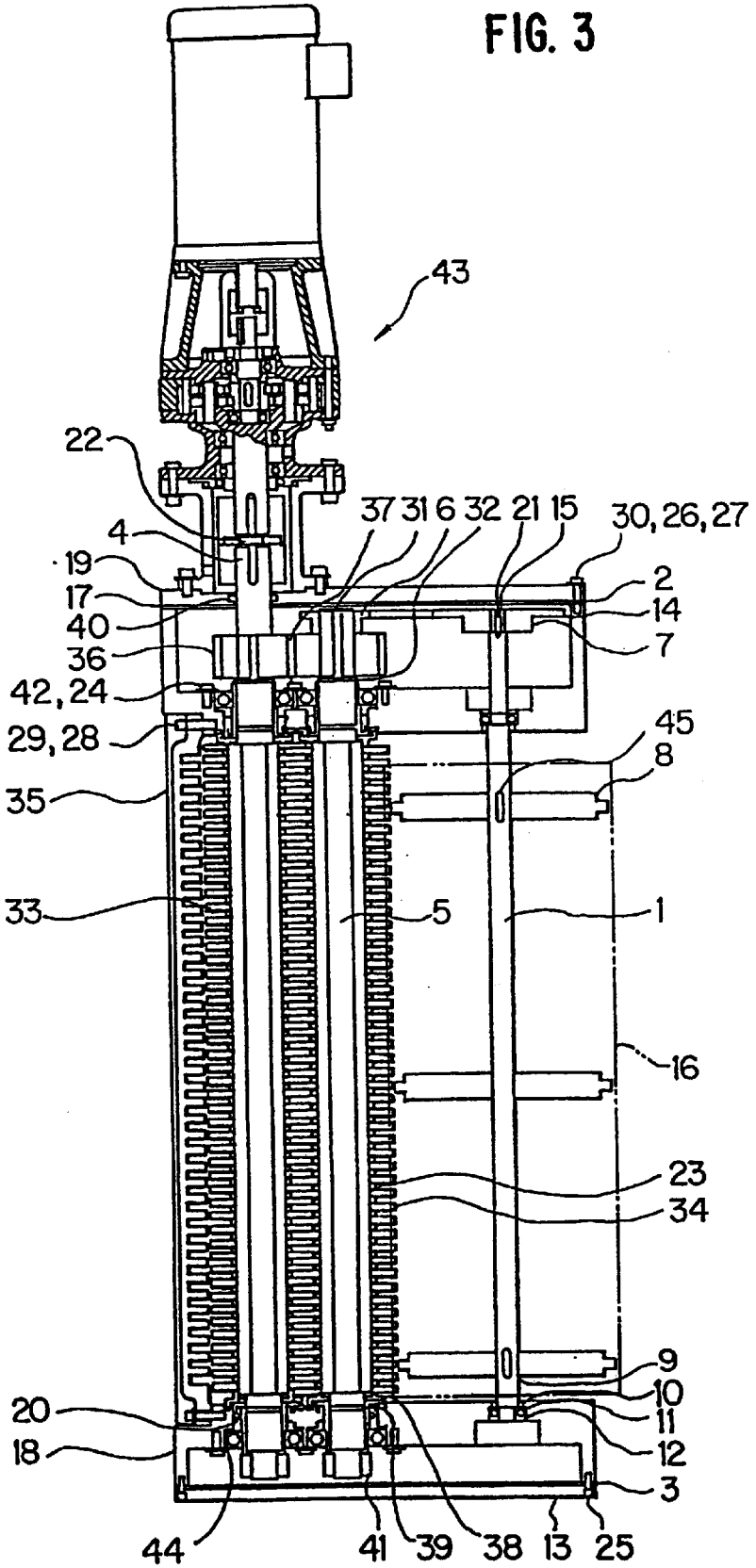
FIG. 3 is a side cut away view illustrating the essential components of the first preferred embodiment.

Referring not to FIGS. 1, 2, and 3 a first preferred embodiment of this invention will be described. The preferred embodiment comprises three major sub-components which are integrated together to form a unitary system. These are the frame element 100, the grinder element 200 and the single shaft rotating screen 300. Referring now to FIGS. 1 and 3, the housing comprises a top cover 19 and a bottom cover 13. An end housing 17 is associated with the top cover and an end housing 18 is associated with the bottom cover 13. The bottom end housing 18 is affixed to the bottom cover 13 by means of a series of fasteners 25. Similarly, the top cover 19 is coupled to the end housing associated with the top 17 by means of appropriate fixing elements, typically the combination of a washer 26, a split lock washer 27 and a lock screw 30.

Positioned between the two end housings 17 and 18 is a slotted side rail 35. The slotted side rail acts not only as a spacer between the top and bottom end housing but also the manner by which flow through the cutting unit is improved by purposes of channeling fluid direction in a manner generally parallel to the cutter elements. This is accomplished by slotting the side rail to have a series of parallel flow paths extending in a spaced but staggered arrangement relative to the adjacent cutter stack 33.

The grinder unit comprises a dual shaft system comprising a drive shaft 4 and a driven shaft 5. On the driven Shaft 5 cutter elements 34 alternate with spacer elements 23. On the drive shaft 4 cutter elements 33 also interleave with spacers, as illustrated in FIG. 3. The result is that at the overlapped point between the two cutter assemblies the cutter elements on one shaft interleave with the cutter elements on the other shaft because of the staggered relationship between spacer elements on the two shafts.

While the foregoing discusses rudimentary details of the grinder element which will be disclosed in greater detail here, reference is made to U.S. Pat. No. 4,046,324 for a more complete discussion of a suitable system.

The cutter assembly is journalled for rotation in the bottom end housing by means of a seal assembly 44. Hex nuts 41 are used to lock the shafts into position. The hex nuts 41 when tightened, tend to compress a compression disc 38 to provide the necessary degree of resilience as the stack is tightened. An external O-ring provides a seal for the seal assembly 44 and internal O-rings 39 about the respective shafts 4 and 5 isolate the interior of the cutter assembly from liquid. The bearing assembly 44 may be a separately removable cartridge having, as a replaceable unit, bearings, stator and rotating race assemblies together with associated internal O-ring assemblies.

At the upper end of the frame element 100, the side rail 35 is fixed into position by means of locking elements 28 and 29. Shafts 4 and 5 are held relative to the top end housing 17 and bottom end housing 18 by means of clamping elements 24 and 42, that is, a series of washers and hexagonal bolts. Element 32 is a retaining ring. As illustrated in FIG. 3, an upper seal assembly is provided relative to each of the shafts. Drive shaft 4 is coupled to a motor 43 by means of a key 22. The motor 43 is illustrated in FIG. 3 as an electric motor. However, as illustrated in FIG. 1 the motor may be hydraulic. Thus in this embodiment, as in the case of the this invention, the choice of motor drive for the system is not important. It is understood then that the drive device of FIG. 3 could also be a hydraulic system having a rotary output suitably keyed to the drive shaft 4.

An oil seal 40 is provided in the top cover 19 to isolate the drive shaft 4. The drive shaft 4 has mounted to it a pinion 36, which in turn drives the gear 37 mounted on the driven shaft 5. The driven shaft also has mounted above the gear 37 a sprocket 6 to be discussed herein. A retaining ring 31 is used to lock the sprocket 6 in position on the drive shaft 6. A retaining ring 32 is used to position the gear 37 on the driven shaft 5. A similar retaining ring is used on the drive shaft 4 relative to the pinion 36.

The rotating screen 300 is mounted on a shaft 1. The shaft is journalled for rotation by a bearing assembly 11 held in place by a retaining ring 12. An oil seat 10 isolates the bearing 11 so that the shaft 1 can rotate on the mount as illustrated in FIG. 3, which is a part of the bottom end housing 18.

The screen utilizes a belt 16 held in place on shaft 1 by means of a series of spaced sprockets 8. Each of the sprockets is mounted on the shaft 1 by means of an associated retaining ring 9. At the upper portion of the shaft 1 a sprocket 7 is mounted for rotation utilizing a retaining ring 15 and key 21. A chain 14 is driven by the sprocket 6 and is mounted on the sprocket 7 so that for each rotation of the driven shaft 5 there is corresponding rotation of the screen 16. As appropriate, the housing is gasketed by means of top gasket 2 and bottom gasket 3 to provide the necessary resiliency and sealing between the housing members.

While this embodiment employs a sprocket and chain drive, it will be appreciated that other drive mechanisms may be used as gears, belts and the like. The relative rotational speed of the grinder elements to that of the diverter screen is determined by the diameters of the drive and driven sprockets. This may also be accomplished by gearing arrangements, differential sprocket geometries or other well known techniques to create different rotational speeds between elements driven from a common source. It will be appreciated that is preferable for the grinder to rotate at one speed and the screen at another to promote the effective transfer and grinding of debris. Also, to that end the diameter of the screen diverted can be modified as a function of channel size to increase flow characteristics of the system.

Referring now to FIGS. 2 and 3, the relationship between the screen 300 and the cutting elements of the grinder unit 200 are depicted. As illustrated in FIG. 2 the screen sprocket 8 has a series of teeth 46 which engage vertical element 47 in the screen 16. The outer circumference of the screen 16 defines a circle. Likewise, the outer circumferential points of the cutter elements of each of the cutters 34 defines a circle. The tangent common to those two circles is illustrated by the line T—T in FIG. 2. Consequently, in mounting the screen assembly 300, relative to the cutter assembly 200, this geometric orientation is satisfied by mounting those elements on a frame element 100. The orientation is maintained as illustrated in FIG. 3 by having the shafts 1, 4, and 5 mounted ultimately on a common bottom end section 18.

It is also noted that while FIG. 1 shows the drive unit as being hydraulic, FIG. 3 illustrates the interchangeable nature of the system utilizing the electric motor 43. That is, a hydraulic unit 50 having input 51 and outlet 42 forming the hydraulic lines for the system can be used in place of an electric motor 43.

Figure 4:
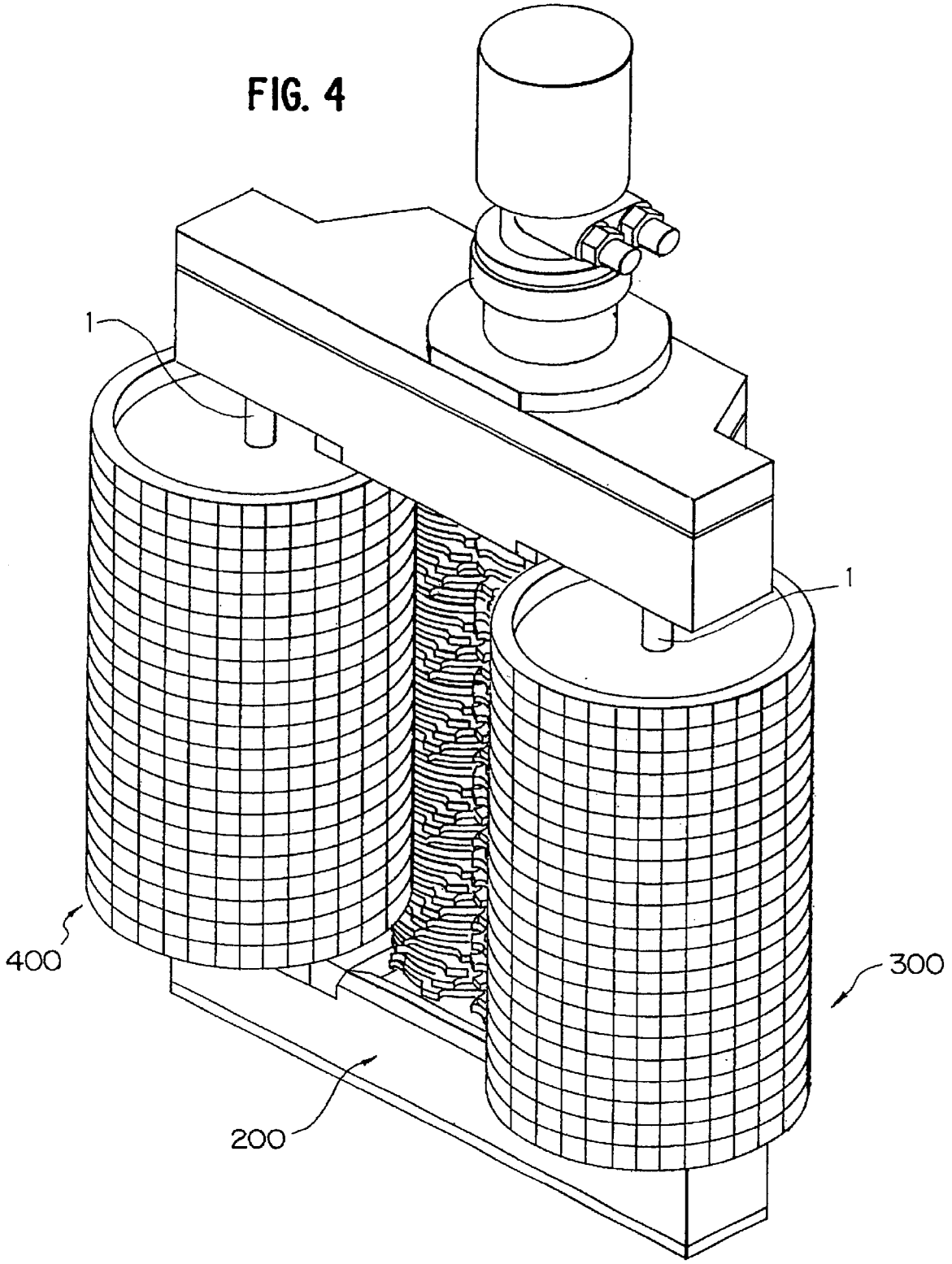
FIG. 4 is a perspective view of a second preferred embodiment of this invention utilizing a pair of rotating screens with a grinder unit centered therebetween.
Figure 5:
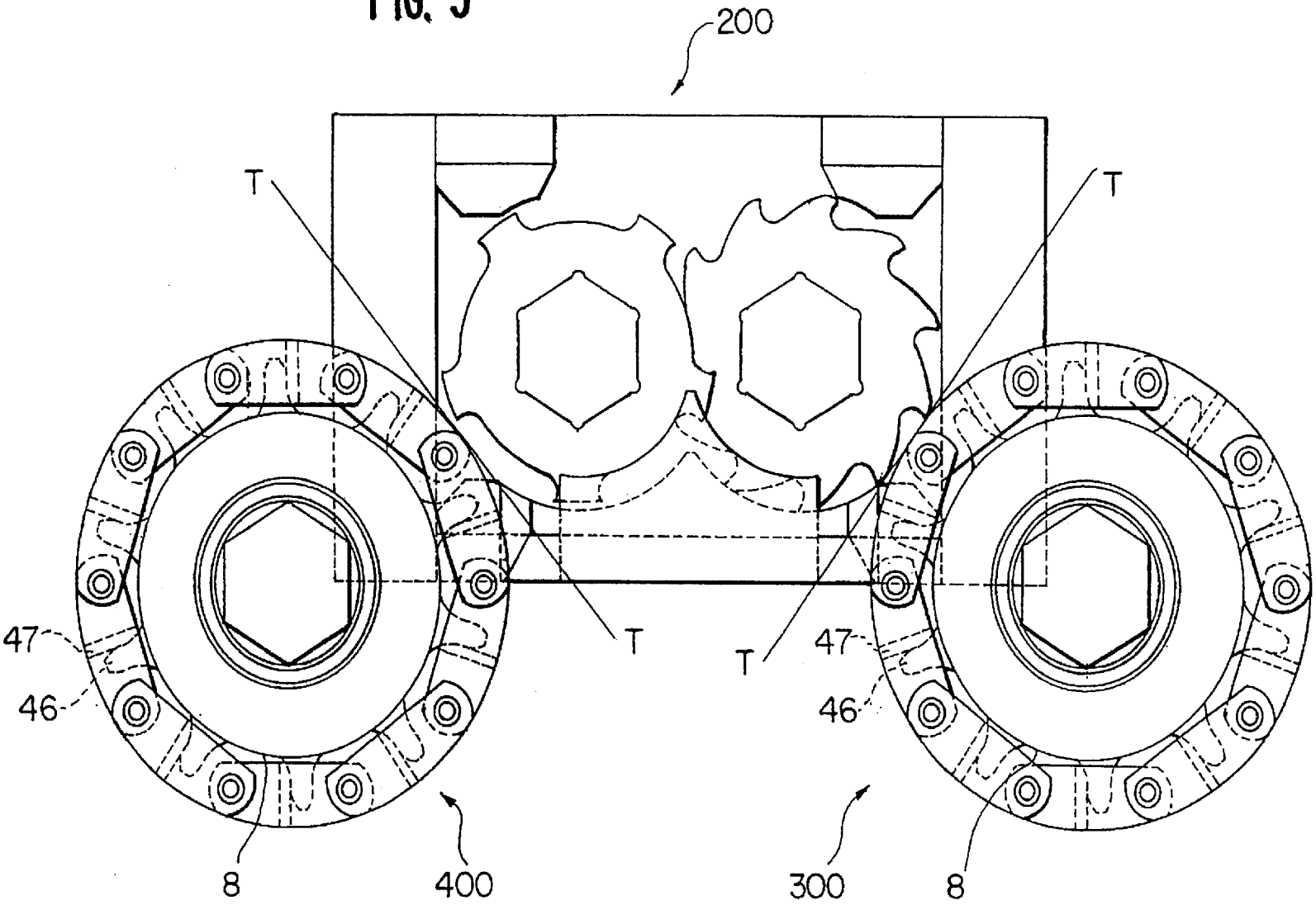
FIG. 5 is a top view of the second preferred embodiment of this invention.

Referring now to FIGS. 4 and 5 a second preferred embodiment of this invention is depicted. In the first preferred embodiment a single shaft rotating screen unit is illustrated. While illustrating a "left hand model" with the screen placed to the left of the cutter assembly, it is obvious that the system could be reversed having a "right handed model" as illustrated in FIG. 2. The modification in FIGS. 4 and 5 provides a pair of rotating screen assemblies 300 and 400 together with a centrally disposed cutter unit 200. FIG. 4 illustrates the alternative of using hydraulic power.

FIGS. 4 and 5 thus illustrate a symmetrical condition with the cutter unit 200 positioned between screens 300 and 400. The screens 300 and 400 are identical, driven off a centrally disposed drive shaft having the same sprocket drives as illustrated in FIG. 3. Since common elements are used, they have been given identical labels in FIG. 5. It is also noted that the tangential alignment between cutter stack and screen which exists with the single screen cutter embodiment of FIGS. 1 and 2 is maintained in the dual screen unit of FIGS. 4 and 5. The two tangential lines T—T and T—T are illustrated in FIG. 5.

By comparing the components forming in top and bottom end housings 17 and 18, as illustrated in FIG. 1, it can be appreciated from FIG. 4 that those same units are employed by simply having the unit comprised as a second mirror image of that illustrated in FIG. 1. That is, the top housing 17 together with the top cover 19 is replicated in FIG. 4 so that it provides the necessary mounting and fixing points for the second screen unit 400.

In both embodiments, the frame element 100 mounts directly into the waste water channel. Preferably, the waste water channel has concrete walls and the system is bolted into place. The grinding unit of the first preferred embodiment has its rigidity maintained by the use of the side rail 35 and the frame, especially the top cover 19 and the top end housing 17 which, as illustrated in FIG. 2, mounts directly to the grinder unit. In the second preferred embodiment, using a pair of diverter screens the side rail is eliminated. Rigidity is accomplished by the inherent symmetry of the system attached to the channel frame. If additional structural rigidity is desired an input side guide plate may be installed (not illustrated).

An important advantage of this system is that the grinder unit while integrally mounted, can be separately removed from the housing by removing the top cover 19, the top end housing 17 and then simply dismantling the associated drive elements to the screen assembly.

As is apparent from the drive elements illustrated in FIG. 2, the rotational direction of the screen cylinder shaft 1 is accomplished by means of a chain that is slaved to the driven shaft by means of a sprocket assembly. Consequently, a reversal in the direction of grinder rotation automatically reverses the direction of cylinder rotation. This is done because the units rotate via a common chain.

In the case of the second preferred embodiment illustrated in FIGS. 4 and 5, the second screen unit 14 is driven off the pinion 36 by means of a sprocket, not shown, but similar to sprocket 6 on the driven shaft 5. This will permit the two screens 300 and 400 to rotate in opposite direction thus diverting solids into the center of the grinding unit 200. That is, the direction of rotation of screen 300 is the same as that of the driven shaft 5 while the direction of rotation of the screen 400 will be the same as that of the drive shaft.

Figure 6:
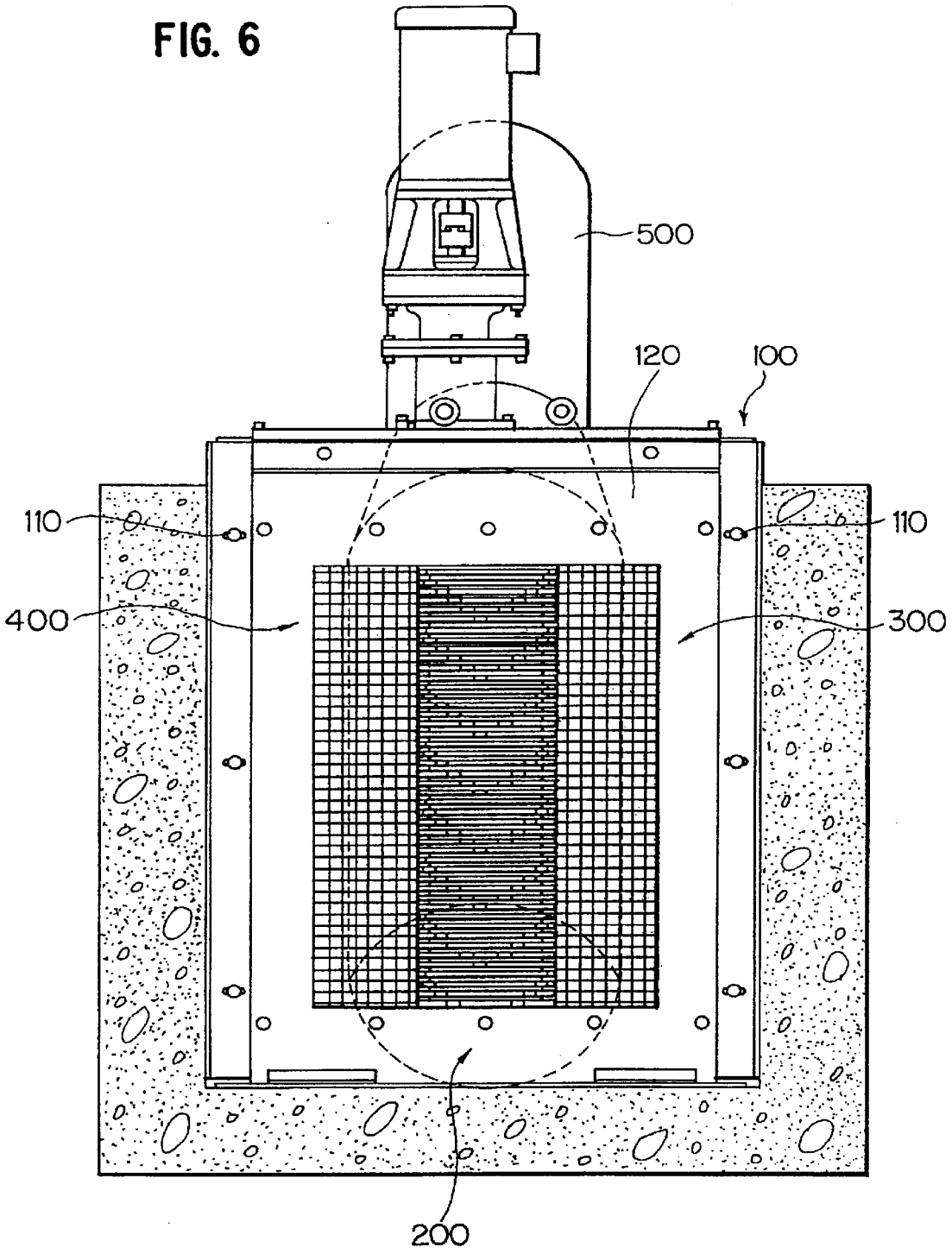
FIG. 6 is a front view of a modification of the second preferred embodiment employing an auger-screening separator.
Figure 7:
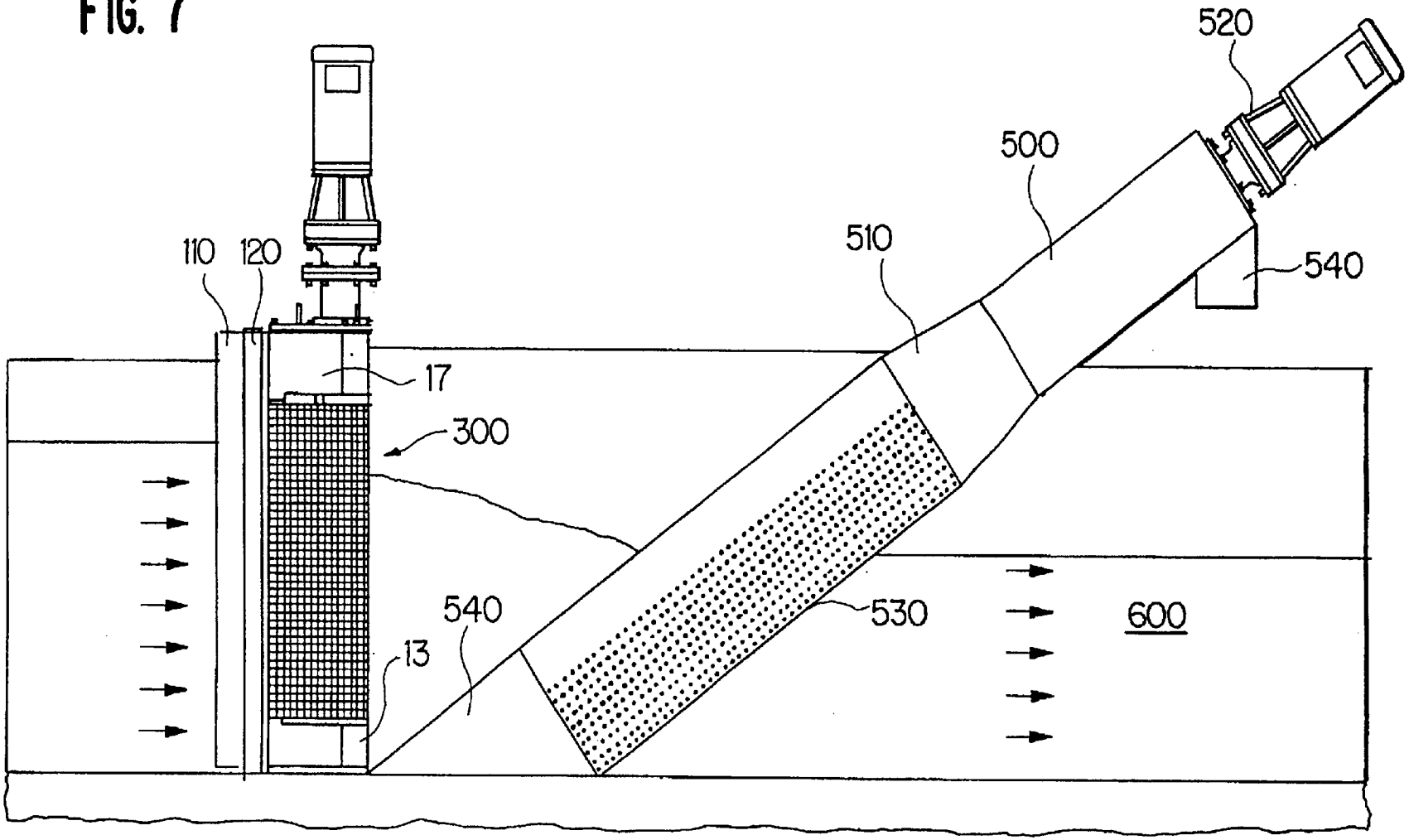
FIG. 7 is a side elevation view of the modification illustrated in FIG. 6.

Referring now to FIGS. 6 and 7 a modification of the second preferred embodiment is illustrated. In this modification the same numbers are used to denote corresponding elements as in the second preferred embodiment. The prime modification is the use of an auger-screen 500 positioned immediately behind the grinder 200. The auger-screen 500 comprises an elongated tapered tubular housing 510 with the internal auger (not illustrated) powered by a motor 520. In the larger diameter portion a screen 530 is placed. Thus, entrained liquid from the grinder effluent is returned to the flow path 600 while the coarse materials are lifted and removed via the chute for off-line handling. A pair of deflectors, now shown, is positioned immediately behind the grinder to deflect the effluent to the auger 500.

In operation the flow path through the diverter screens is substantially free of debris. Downstream of the unit that flow is maintained. At the central grinder section, solids are reduced in size and deposited in the auger screening separator 500 at a trough 540. The auger then transports the material upward where it is screened at section 530 and the larger pieces ultimately removed at the chute 540.

FIGS. 6 and 7 also illustrate the use of a front guide plate. The frame element 100 comprises an open box frame having vertical L-angle elements 110 to secure the frame to the channel walls (see FIG. 6). The unit completely spans the channel. A guide plate 120 is mounted between the channel pieces 110 and has an opening overlapping the diverter screens 300 and 400. By this technique flow which tends to stagnate at the walls is channelled into the central portions of the diverter screens.

In addition to the modifications specifically delineated herein, it is apparent that other modifications may be made to this invention without departing from the scope thereof. For example, while a dual shaft grinder unit is disclosed, this invention will operate with a single shaft grinder unit. Also, the auger-screen system can be employed with the single screen embodiment.

We claim:

1. A system for diverting and reducing the size of waste materials in an effluent stream comprising:

a frame mountable in said stream;

a grinder unit mounted to said frame, said grinder unit comprising a cutter assembly positionable in said stream and a drive mechanism on said frame coupled to said cutter assembly to rotate said cutter assembly; and a diverter unit mounted to said frame, said diverter unit comprising a waste material diverter rotatable on a shaft, said shaft mounted to said frame and positioned generally perpendicular to a direction of flow of said stream, and a drive assembly operably coupled to said drive mechanism to rotate said diverter unit as said cutler assembly rotates, wherein said diverter unit is positioned adjacent to said grinder unit to divert solids in said effluent stream toward said grinder unit for size reduction.

2. The system of claim 1 further comprising a side rail mounted in said frame adjacent said grinder unit, said side rail stabilizing said grinder unit in said frame and enhancing flow of liquid through said grinder unit.

3. The system of claim 1 wherein said drive mechanism comprises a power source producing a rotary output, a power transfer mechanism to rotate and cutler assembly and wherein said drive assembly comprises a first sprocket mounted to said shaft and a chain coupling said sprocket and said power transfer mechanism to rotate said [screen] *diverter unit*.

4. The system of claim 3 wherein said grinder unit comprises a pair of cutter shafts having an array of interleaved cutter elements, said power transfer mechanism comprising a pinion on one of said shafts which is driven by said power source, the other of said shafts having a gear driven by said pinion and a second sprocket mounted on said other shaft.

5. The system of claim 3 wherein said power source is an electric motor.

6. The system of claim 3 wherein said power source is a hydraulic drive.

7. The system of claim 1 further comprising a second diverter unit mounted to said frame and driven by said drive mechanism, both of said diverter units positioned on adjacent sides of said grinder unit to divert solids in said effluent stream into said grinder unit.

8. The system of claim 1, wherein said diverter unit comprises a screen, said screen having a cylinder with an open grid, a series of spaces to hold said cylinder to said shaft and wherein said cylinder and said cutter assembly have a common tangent defining the orientation of said diverter unit relative to said grinder unit.

9. The system of claim 1 wherein said shaft is journalled for rotation in said frame and a bearing assembly supporting said shaft.

10. The system of claim 1 wherein said grinder unit is journalled for rotation in said frame and a removable bearing and seal assembly supporting said grinder unit on said frame.

11. The system of claim 1 further comprising an auger-screen positioned immediately downstream of said grinder unit.

12. The system of claim 11, wherein said auger-screen comprises an elongated tapered housing having a screen section and a trough at an upper end of said housing.

13. The system of claim 1, wherein said diverter unit comprises a cylindrical unit having flow paths to permit fluid from said stream to pass therethrough as said cylindrical unit rotates, the periphery of said cylindrical unit having a series of diverting elements to contact and urge waste materials toward said grinder unit and not pass in said effluent stream.

14. An integrated system for diverting and reducing the size of waste materials in an effluent stream comprising:

a frame having a bottom housing and a top housing and mountable in said stream;

a grinder unit mounted to said frame bottom housing, said grinder unit comprising a cutter assembly positionable in said stream and a drive mechanism mounted on said frame and coupled to said cutter assembly to rotate said cutter assembly; and a diverter unit mounted to said frame, said diverter unit comprising a cylindrical waste material diverter rotatable on a shaft, said shaft mounted on said bottom housing of said frame and supporting said cylindrical waste material diverter, and a drive assembly operably coupling said drive mechanism to said shaft to rotate said cylindrical waste material diverter as said cutter assembly rotates, wherein said diverter unit is positioned adjacent to said grinder unit to divert solids in said effluent stream toward said grinder unit for size reduction.

15. The system of claim 14 further comprising a side rail mounted in said frame adjacent said grinder unit and coupled to both said top and bottom housings, said side rail stabilizing said grinder unit in said frame and enhancing flow of liquid through said grinder unit.

16. The system of claim 14 wherein said drive mechanism comprises a power source producing a rotary output, a power transfer mechanism to rotate said cutter assembly and wherein said drive assembly comprises a first sprocket mounted to said shaft and a chain coupling said sprocket and said power transfer mechanism to rotate and diverter unit.

17. The system of claim 16 wherein said grinder unit comprises a pair of cutter shafts having an array of interleaved cutter elements, said power transfer mechanism comprising a pinion on one of said shafts which is driven by said power source, the other of said shafts having a gear driven by said pinion and a second sprocket mounted on said other shaft.

18. The system of claim 16 wherein said power source is an electric motor.

19. The system of claim 16 wherein said power source is a hydraulic drive.

20. The system of claim 14 further comprising a second diverter unit mounted to said frame and driven by said drive mechanism, both of said diverter units positioned on adjacent sides of said grinder unit to divert solids in said effluent stream into said grinder unit.

21. The system of claim [11] *14*, wherein said diverter unit comprises a cylindrical screen with an open grid, a series of spaces to hold said cylindrical screen to said shaft and wherein said cylindrical screen and said cutter assembly have a common tangent defining the orientation of said diverter unit relative to said grinder unit.

22. The system of claim 14 wherein said shaft is journalled for rotation in said bottom housing and a bearing assembly supporting said shaft.

23. The system of claim 14, wherein said grinder unit is journalled for rotation in said bottom housing, and a removable bearing and seal assembly [position] *is positioned* in said bottom housing for supporting said grinder unit on said frame.

24. The system of claim 14 further comprising a guide plate mounted to said frame to channel materials in said effluent [flow] *stream* towards said screen unit.

25. The system of claim 14 further comprising an auger-screen positioned immediately downstream of said grinder unit.

26. The system of claim 25, wherein said auger-screen comprises an elongated tapered housing [have] *having* a screen section and a trough at an upper end of said housing.

27. The system of claim 14, wherein said cylindrical waste material diverter comprises a screening element having openings to allow liquid from said effluent stream to pass through and, on the periphery of said screening element a series of diverting elements to contact and urge waste materials towards said grinder unit and not pass in said effluent stream.

*28. A system for diverting and reducing the size of solid waste materials in a liquid stream comprising:*

*a grinder unit positionable in the stream and comprising a cutter assembly for reduction in size of solid waste in the stream, said cutter assembly having dual shafts, and a motor operably coupled to said cutter assembly to rotate said dual shafts of said cutter assembly for counter-rotation,*

*a diverter unit positionable along side said grinder unit so that both said diverter unit and said grinder unit are positioned substantially transverse to the flow of fluid in said stream to independently block said solid waste material in the stream, said diverter unit having a moving diverter element, wherein solid waste in said stream contacting said diverter unit is diverted by movement of said diverter element transversely towards said grinder unit for size reduction while liquid in said stream passes through said diverter unit and solid waste in said stream directly contacting said grinder unit is also reduced in size.*

*29. The system of claim 28 further comprising a drive mechanism coupling said motor to said dual shafts of said cutter assembly, and a drive assembly for moving said diverter element, said drive assembly operably coupled to said drive mechanism to rotate said diverter element in the same direction as an adjacent shaft of said cutter assembly.*

*30. The system of claim 28 wherein said grinder unit comprises an array of interleaved cutter elements, said drive mechanism comprising a pinion mounted to one of said cutter shafts which is driven by said motor and the other of*

*said cutter shafts having a gear driven by said pinion, whereby said cutter shafts counter-rotate.*

*31. The system of claim 28 further comprising a frame positioning said diverter unit and said grinder unit in said stream as an integral unit and a fixed flow path guide mounted to one side of said frame.*

*32. The system of claim 28 wherein said moving diverter element comprises a cylindrical screen.*

*33. The system of claim 28 further comprising a frame positionable in said stream, wherein said diverter unit and said grinder unit are mounted on said frame to form an integral assembly such that the axes of rotation of each shaft of said dual shaft cutter assembly lie in a plane substantially perpendicular to said flow in said stream.*

*34. The system of claim 28 further comprising another diverter unit having a diverter element for diverting solid waste towards said grinder unit, said grinder unit positioned between said diverter units and, a drive assembly to move respective diverter elements to divert solid waste transversely across said liquid stream toward said grinder unit.*

*35. The system of claim 34 further comprising a frame to mount said diverter units and said grinder unit and orient said diverter units and said grinder unit in a symmetrical arrangement with respect to the direction of fluid flow in said stream.*

*36. The system of claim 34 wherein each of said diverter units comprises a rotating screen.*

*37. A system for diverting and reducing the size of waste materials in a liquid stream comprising:*

*a frame positionable in the liquid stream,*

*a grinder unit mounted to said frame and comprising a cutter assembly and a drive mechanism coupled to said cutter assembly to rotate said cutter assembly;*

*a waste diverter mounted to said frame so that both said waste diverter and said grinder unit are positioned substantially transverse to the flow of liquid in said stream to independently block waste materials in said stream, said waste diverter having a moving element wherein solids in said stream contacting said waste diverter are directed by movement of said moving element towards said grinder unit for size reduction and solids in said stream directly contacting said grinder unit are also reduced in size.*

*38. The system of claim 37 further comprising a drive assembly for moving said moving element of said waste diverter and a motor for supplying power to said drive mechanism and said drive assembly.*

*39. The system of claim 38 wherein said grinder unit comprises dual shafts, an array of interleaved cutter elements on said shafts, said drive mechanism comprising a pinion mounted to one of said shafts which is driven by said motor and the other of said shafts having a gear driven by said pinion, whereby said shafts counter-rotate.*

*40. The system of claim 37 wherein said frame positioning said waste diverter and said grinder unit in said stream further comprises a flow diverter positioned adjacent said waste diverter such that solid waste may contact and be reduced in size by direct contact with said grinder unit and, solid waste in said stream contacts said flow diverter and is deflected across said flow of liquid towards said waste diverter.*

*41. The system of claim 40 wherein said flow diverter overlaps said waste diverter.*

*42. The system of claim 37 wherein said moving element comprises a cylindrical screen.*

*43. The system of claim 37 wherein said waste diverter and said grinder unit are mounted on said frame and a single motive source is mounted on said frame to power both said grinder unit and said waste diverter.*

*44. The system of claim 37 further comprising another waste diverter mounted on said frame, said another waste diverter having a moving element for directing solid waste towards said grinder unit, said grinder unit positioned between said waste diverters and, a drive assembly to move respective moving elements in a manner such that solid waste is diverted laterally inward toward said grinder unit.*

*45. The system of claim 44 wherein said waste diverters are mounted to said frame such that the moving elements are in alignment with each other and lie in a plane that extends substantially transverse to the flow of liquid in said stream.*

*46. The system of claim 44 wherein said grinder unit is aligned with said diverter units, and said grinder unit and said diverter units are arranged symmetrically in a direction transverse to the flow of liquid in said stream.*

*47. A system for diverting and reducing the size of solid waste materials in a liquid stream, comprising:*

*a frame positionable in the stream,*

*a cutter assembly mounted on said frame and having at least two shafts and a motor operably coupled to said cutter assembly to rotate said shafts in opposite directions; and*

*a diverter unit mounted on said frame and positioned to one side of said cutter assembly in a direction substantially transverse to a direction of flow of said stream, said diverter unit having a motor diverter element, wherein solid waste in the stream contacting said diverter unit is diverted by movement of said diverter element transversely across said stream towards said cutter assembly while liquid in said stream passes through said diverter unit.*

*48. The system of claim 47 wherein said diverter element comprises a rotating member.*

*49. A system for diverting and reducing the size of waste materials in a liquid stream comprising:*

*a frame positionable in the stream;*

*a grinder unit mounted to the frame and comprising a cutter assembly having at least two shafts and a drive mechanism coupled to said cutter assembly to rotate said shafts; and*

*a waste diverter mounted to said frame laterally of said grinder unit so that both said waste diverter and said grinder unit directly confront the flow of the stream and independently block waste materials in said stream, said diverter unit having a moving element that diverts solids in the stream laterally across said stream toward said grinder unit.*

*50. The system of claim 49 wherein said moving element comprises a rotating screen.*

* * * * *